United States Patent [19]

Kume et al.

[11] Patent Number: 4,916,376

[45] Date of Patent: Apr. 10, 1990

[54] INVERTER DRIVING METHOD FOR INDUCTION MOTORS

[75] Inventors: Tuneo Kume; Toshihiro Sawa, both of Kitakyushu; Masanobu Miyazato, Yukuhashi; Mitsujiro Sawamura, Kitakyushu; Michihiko Zenke, Yukuhashi, all of Japan

[73] Assignee: Kabushiki Kaisha Yaskawa Denki, Fukuoka, Japan

[21] Appl. No.: 211,319

[22] Filed: Jun. 24, 1988

[30] Foreign Application Priority Data

Jun. 26, 1987 [JP] Japan .................................. 62-160325
Jul. 31, 1987 [JP] Japan .................................. 62-193458
Jul. 31, 1987 [JP] Japan .................................. 62-193459

[51] Int. Cl.$^4$ ............................................. H02P 5/40
[52] U.S. Cl. ..................................... 318/808; 318/771; 318/800
[58] Field of Search ......... 318/803, 800, 805, 807–811

[56] References Cited

U.S. PATENT DOCUMENTS 3,297,926 1/1967 Campbell et al. ................... 318/721
4,091,294 5/1978 Zankl et al. .......................... 318/808

OTHER PUBLICATIONS

Ito et al, "Analysis of Field Orientation Control Of Current Source Inverter Drive Induction Motor Systems", IEEE Transactions on Industry Applications, vol. IA-19, No. 2, Mar./Apr. 1983, pp. 206–210.

Primary Examiner—David Smith, Jr.
Attorney, Agent, or Firm—Jordan and Hamburg

[57] ABSTRACT

An inverter driving method for has an arrangement polyphase induction motor, for altering a plurality of winding connections of the motor and a storage arrangement for a plurality of motor control constant groups preset corresponding to the respective winding connections so as to perform optimal vector control. When the classification of the winding connection is selected, one set of motor control constant groups corresponding to the winding connection is read out of the storage arrangement and applied to a control unit of the induction motor as control constants.

1 Claim, 6 Drawing Sheets

INVERTER DRIVING METHOD FOR INDUCTION MOTORS

BACKGROUND OF THE INVENTION

1. Field of the Invention

The present invention relates to an inverter driving method for induction motors for which a wide constant power control range is needed, such as for those used for the drive of main spindles of machine tools, electric vehicles, and the like and particularly to a method in which the constant power control range is widened by changing-over a winding connection system for induction motors.

2. Prior Art

In a drive for the main spindles of machine tools and the like, connection for the motor windings are sometimes switched to a Δ-Y connection for the inverter drive in order to widen the constant power control range for the machine tool, as shown in FIG. 9.

In FIG. 9, reference numeral 1 is a motor having three-phase windings 2 through 4, that is U-U', V-V', and W-W' windings, reference numeral 62 is an inverter which has a switching control function for the windings and controls the speed of motor 1, and comprises a main circuit 51 and V/F controller 63. The voltage and frequency reference $VF_{REF}$ is given by a frequency reference device 61. Reference numerals 6 and 7 are switches which change-over the windings to a Δ connection or a Y connection. These switches 6 and 7 are changed-over by a winding change-over signal 55 sent from the controller 63 according to the winding selecting signal 22. When the switches 6 and 7 are actually changed-over, a winding change-over answer signal 54 is output to the controller 63. Reference numeral 33 is a switchgear including the switches 6 and 7. From the controller 63, a base drive signal 53 is output to the main circuit 51. This winding connection is a Y connection with the switch 6 closed and the switch 7 opened, and it is a Δ connection with the switch 6 opened and the switch 7 closed. Though the configuration in FIG. 9 is for the winding connection of a Y-Δ type, configurations for other winding connections are the same as above in the basic configuration.

FIG. 9 shows the case where windings of Y-Δ connections are changed-over. Besides these connections, Y-2Y connection, a Δ-2Δ connection, and a combination of these connections are considered.

FIG. 8 represents output characteristics in both cases where the motor windings are under Y-connection and under Δ-connection. In FIG. 8, symbols 1 and 2 show the bare characteristics of an induction motor of a Δ connection. The curve of 1 is determined by the output current of an inverter, and the curve of 2 by the output voltage of the inverter.

Also, the line of symbol 3 is determined by the output limit of the inverter. Based on these characteristics, the induction motor is controlled so as to have a characteristic shown by the bold line. The section between a motor speed $N_1$ and a motor speed $N_2$ in FIG. 8 form a constant power control range. When a Δ connection of motor windings is changed-over from a Δ connection to a Y connection, the base speed becomes $1/\sqrt{3}$ times that in a Δ connection, and it is in the constant power control range shown by dotted lines.

As described above, when the motor is used with its winding connection changed-over from a Y connection to a Δ connection and vice versea, it is possible to control the motor in a wide constant power control range which can not be obtained by a single connection.

As an inverter drive system using such a changeover of connection, since motors having different characteristics are driven, an inverter using V/F control is generally employed.

However, as the exciting current and secondary current interfere with each other in the case of a V/F control, the dynamic characteristic of the motor is not very good.

The present invention is devised by considering such a problem, and its object is to improve the dynamic characteristic in the drive of motors provided with different characteristics depending upon the method of connection of the motor windings.

SUMMARY OF THE INVENTION

The present invention is characterized in that in an inverter driving method for a polyphase induction motor, a means are provided for altering a plurality of winding connections of the same motor and a memory is provided for a plurality of motor control constant groups preset correspondingly to respective winding connections so as to perform optimal vector control. When the classification of the winding connection is selected, one set of motor control constant groups corresponding to the winding connection is read out of the above memory and applied to a control unit of the above-mentioned induction motor as control constants.

DETAILED DESCRIPTION OF THE INVENTION

Figure 1:
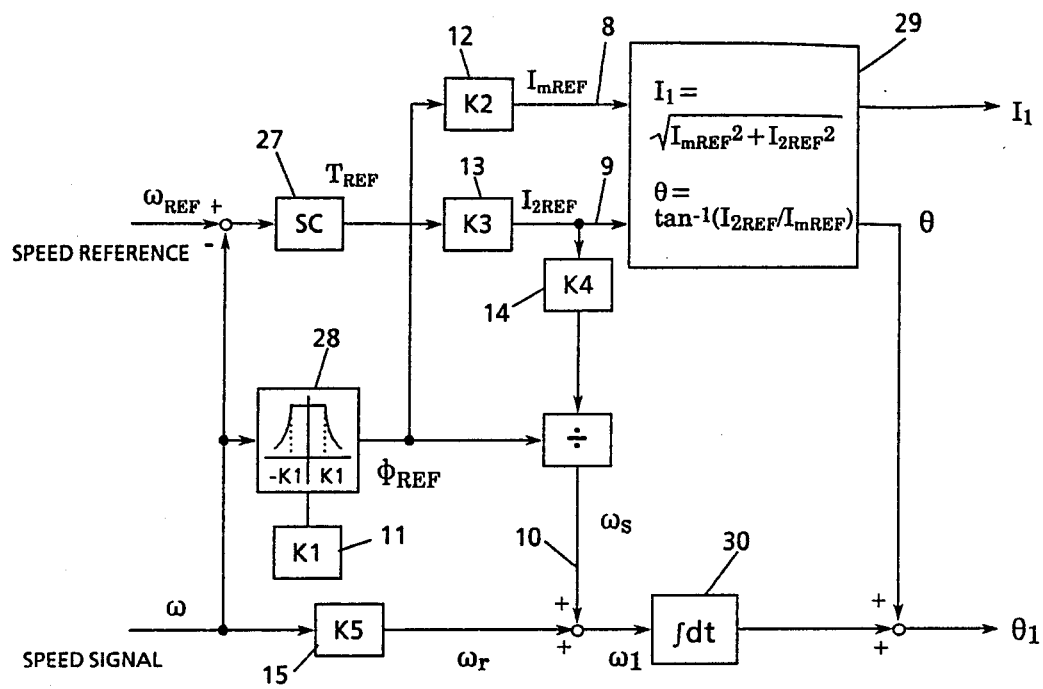
FIG. 1 is a block diagram of a vector control method employing the present invention.

Hereinafter, the present invention will be completely described, based on an embodiment shown in the drawings.

Figure 3:
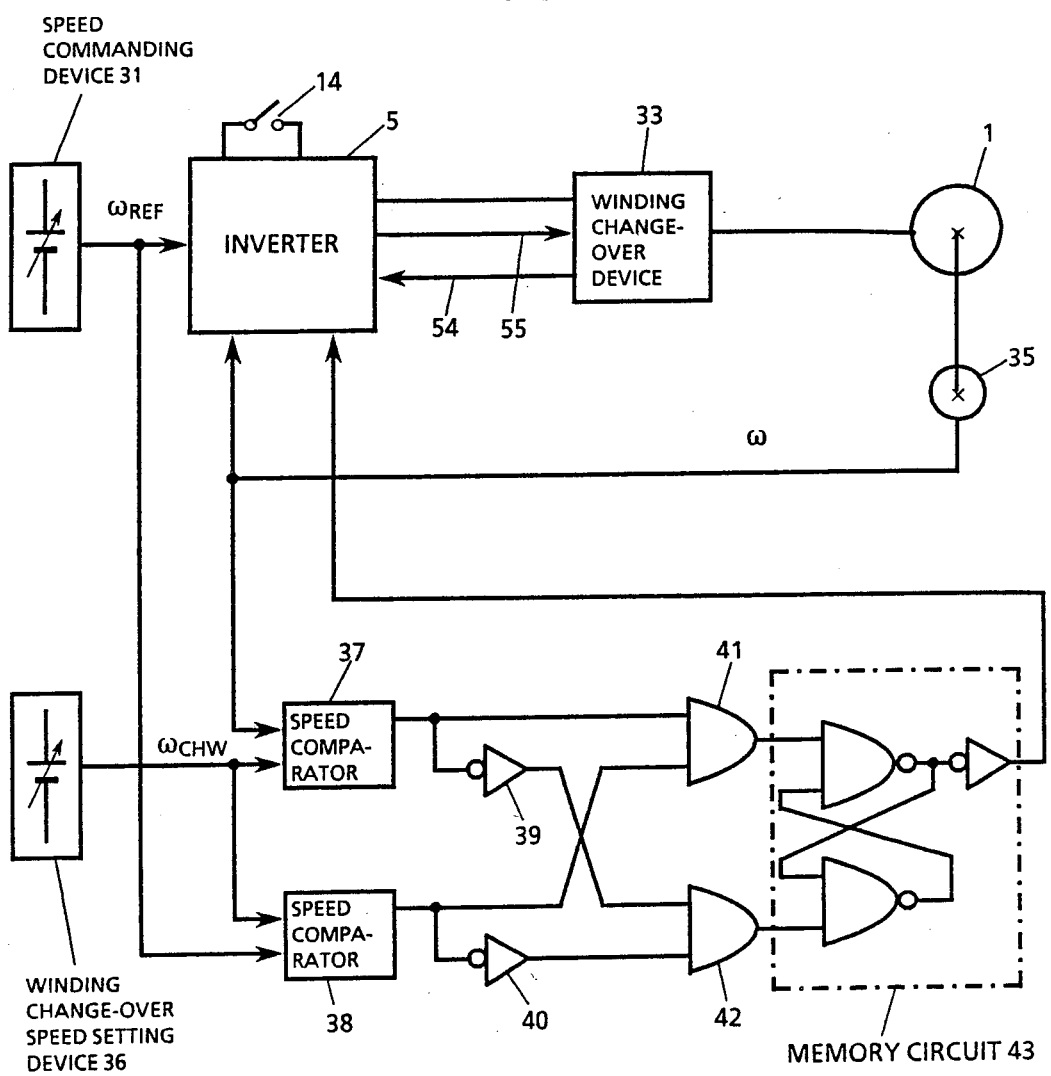
FIG. 3 is a block drawing of an inverter drive including a winding selection command according to the present invention.

In FIG. 1, $\omega_{REF}$ is a speed reference given from a speed reference device 31 in FIG. 3. The difference between the speed reference $\omega_{REF}$ and a detection speed signal $\omega$ from a speed detector 35 in FIG. 3 is provided to a speed regulator 27 to generate a torque reference signal $T_{REF}$. On the other hand, the speed signal $\omega$ is converted into a magnetic flux reference $\Phi_{REF}$ by a magnetic flux regulator 28 which is characterized by a control constant K1. An exciting current reference $I_{mREF}$ 8 is calculated by multiplying the magnetic flux reference $\Phi_{REF}$ by a motor control constant K2. Similarly, a secondary current reference $I_{2REF}$ 9 is calculated by multiplying the torque reference $T_{REF}$ by a motor constant K3. In a coordinate converter 29, the exciting current reference $I_{mREF}$ 8 and the secondary current reference $I_{2REF}$ 9 are converted into a primary current reference $I_1$ and an angle $\theta$ by the following calculation.

$$I_1 = \sqrt{(I_{mREF})^2 + (I_{2REF})^2}$$

$$\theta = \tan^{-1}(I_{2REF}/I_{mREF})$$

The speed signal $\omega$ is converted into a rotational frequency $\omega_r$ by a motor control constant K5. A slip frequency reference $\omega_s$ 10 is calculated by multiplying the secondary current reference $I_{2REF}$ 9 by a motor control constant K4 and divided by the magnetic flux reference $\Phi_{REF}$. The slip frequency $\Phi_s$ 10 and the rotational frequency $\omega_r$ are added together to calculate a primary frequency reference $\omega_1$. The value obtained by integrating $\omega_1$ through an integrator 30 is added to the angle $\theta$ to calculate a primary current angle reference $\theta_1$. Thereby the vector control is realized by operating the inverter main circuit 51 to control the current according to the primary current angle reference $\theta_1$ and the primary current amplitude reference $I_1$.

Among them, the exciting current reference 8, the secondary current reference 9, the slip frequency reference 10, and the like are determined by the motor characteristics, and the motor control constants 11 through 15 are obtained by the motor characteristics corresponding to the individual windings.

Figure 2:
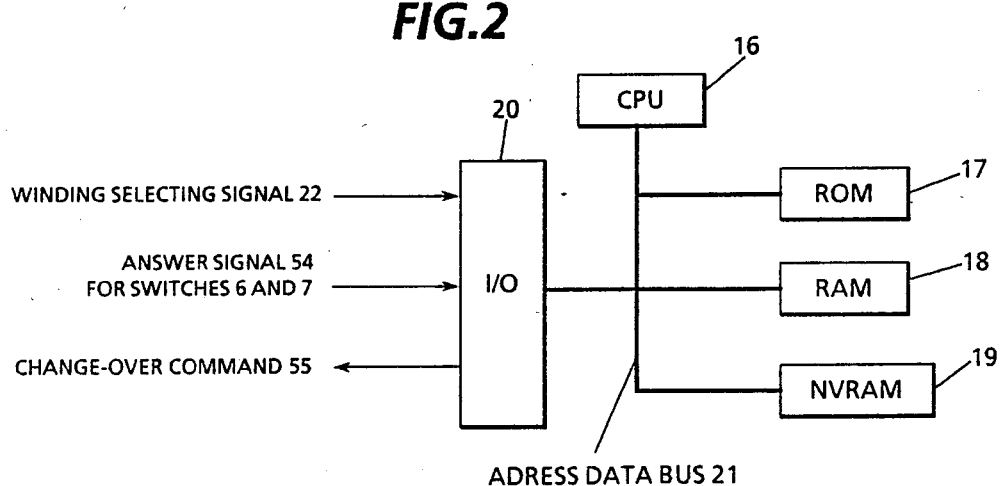
FIG. 2 is a block drawing of a digital control unit.

A block drawing of a digital control unit related change-over of windings in the controller 52 is shown in FIG. 2. Reference numeral 16 is a CPU, reference numeral 17 is a ROM which stores programs, fixed motor control constants, and the like, reference numeral 18 is a RAM which temporarily stores data during calculation, necessary control constants, and the like, reference numeral 19 is a NVRAM which stores data capable of setting and changing motor control constants and the like as required or non volatile memories capable of being electrically rewritten such as EEPROM and the like, reference numeral 20 is an I/O port of an input/output interface, and reference numeral 21 is an address bus.

Figure 7:
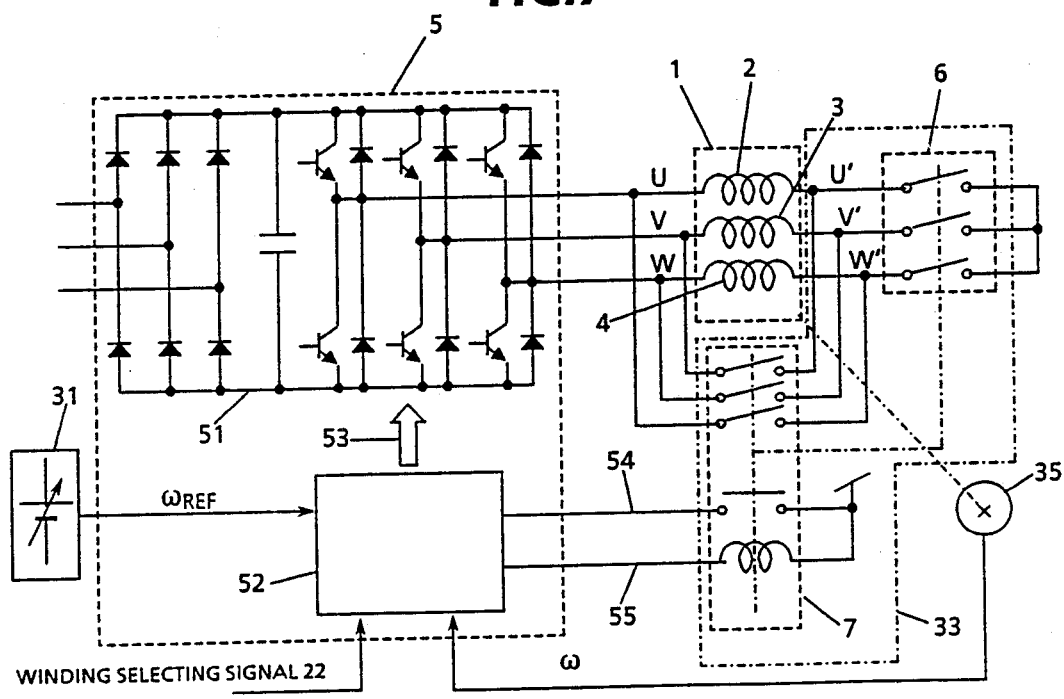
FIG. 7 is a vector-conrolled inverter drive circuit diagram having a switching function for a Y-Δ connection.
Figure 8:
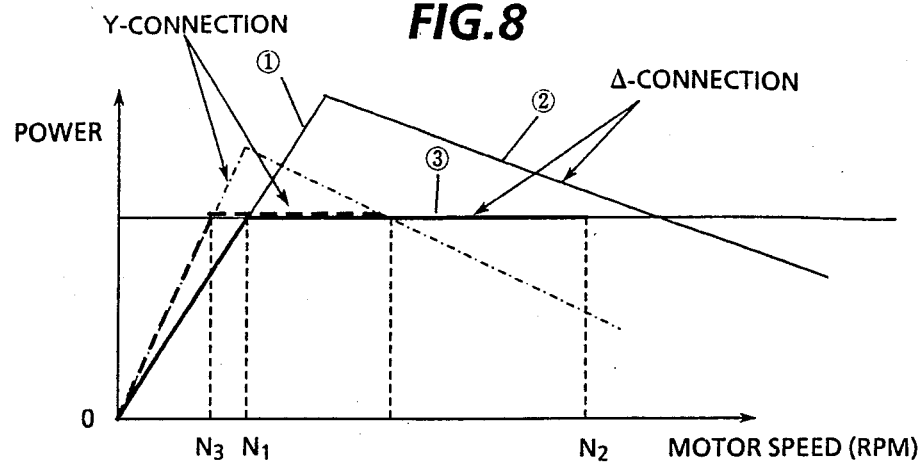
FIG. 8 is a diagram showing an example of an output characteristic in the case where the connection of the motor windings is altered.
Figure 9:
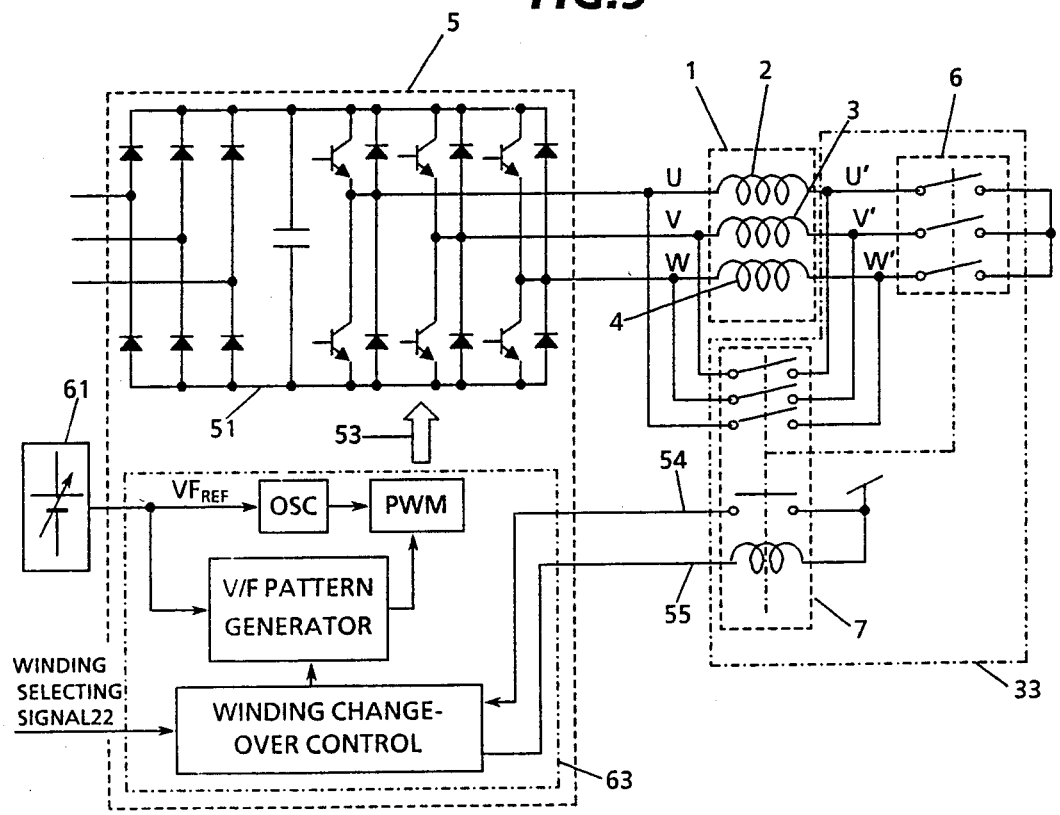
FIG. 9 is a V/F inverter drive circuit diagram having a switching function for a Y-Δ connection.

With the above described construction, a basic operation of change-over of windings will be shown with respect to the example in FIG. 7. The switches 6 and 7 can be made to open and close by the output signal 55 from the digital control unit in FIG. 2, by which the windings 2 through 4 are brought into a Y connection or a Δ connection. The motor control constants 11 through 15 (K1 through K5) at the time of a Y connection and a Δ connection are stored in the ROM 17 and the NVRAM 19. These data are transferred to the RAM 18 and stored therein when the CPU starts.

At first, when a Y connection command is provided as an input signal 22 to the CPU, the CPU 16 judges that the motor operates under a Y connection, closes the switch 6 using the output signal 55, receives its answer signal 54 as an input signal, and starts a vector program. The data at the time of a Y connection which have been stored in RAM 18 are used as the motor control constants 11 through 15 at this time.

Next, when a Δ connection command is provided as the input signal 22, the CPU 16 opens the switch 6 and closes the switch 7, using the output signal 55, receives an answer signal 54 as an input signal, and performs a vector control using the motor control constants 11 through 15 at the time of connection.

In this way, the motor control constants 11 through 15 are selected in accordance with the change-over of the connection of the motor windings, thereby allowing an optimal vector control.

In the present embodiment, change-over of the windings under Y and Δ connections is described, but besides these connections a Y-2Y connection, a Δ-2Δ connection, and a combination of these connections are considered. For these windings, optimal motor control constants are applied thereto, thereby allowing vector control in the same way as in the above-mentioned embodiment. Incidentally, though magnetic switches are used as a means for changing-over windings in the present embodiment, switching elements such as semiconductor switches and the like can be alternatively employed.

The present embodiment allows the same motor to be provided with a plurality of output characteristics, and responsive characteristics in speed and torque to be improved in any connection of windings by vector control. Accordingly, it allows the dynamic characteristic of the induction motor concerned to be improved. Furthermore, since the present embodiment allows torque in a low speed area to be increased, it permits a constant power range to be extended to a low speed area, and permits the motor to be applied to a position control because its responsive characteristic is secured by vector control.

FIG. 3 is a basic block drawing of an inverter drive including a generation circuit for a winding selection command, which is applied with the present invention. Reference numeral 31 is a speed commanding device which outputs the speed reference $\omega_{REF}$, reference numeral 5 is an inverter having a winding change-over control function, reference numeral 1 is a motor, reference numeral 35 is a speed detector for a motor 1, reference numeral 36 is a winding change-over speed setting device which outputs a winding change-over speed reference $\omega_{CHW}$, reference numerals 37 and 38 are speed comparators which compare actual speed $\omega$ with $\omega_{CHW}$ and speed reference $\omega_{REF}$ with $\omega_{CHW}$ respectively, reference numerals 39 and 40 are logic inverters, reference numerals 41 and 42 are AND circuits, reference numeral 43 is a memory circuit, and reference numeral 14 is a switch for runstop of a motor.

At first, assuming that the motor speed reference is 0 rpm when the motor 1 stops, since its actual speed is also 0 rpm, the speed comparators 37 and 38 are both of "L" level, and the output of the AND circuit 41 is of "L" level and the output of the AND circuit 42 is of "H" (High level) level. The output of the memory circuit 43 is, therefore, of "L" level, the inverter 5 is provided with the control constant for a low speed winding, and the winding change-over device 33 is brought into a low speed winding connection.

Next, when the motor is given the motor speed reference $\omega_{REF}$ from the speed commanding device 31 with the switch 14 closed and then operated, it operates with a low speed winding so far as the inequality $\omega_{REF} < \omega_{CHW}$ holds. Furthermore, when $\omega_{REF}$ is made higher, and also it is made larger than $\omega_{CHW}$ and the actual speed $\omega$ is made larger than $\omega_{REF}$, the speed comparators 37 and 38 are both of "H" level, the output of the AND circuit 41 is of "H" level, the output of the AND circuit 42 is of "L" level, and the output of the memory 43 is of "H" level. Accordingly, the inverter is provided with control constants for a high speed winding, and the winding change-over device 33 is brought into a connection of a high speed winding.

When the motor is stopped with the switch 14 opened as the speed reference $\omega_{REF}$ is kept larger than $\omega_{CHW}$, $\omega$ becomes smaller than $\omega_{CHW}$, and the speed comparators 37 is of "L" level. The outputs of the AND circuits 41 and 42 are both, therefore, of "L" level, and the memory circuit 43 keeps the preceding state. In other words, even if the motor is stopped by the switch 14, the winding connection keeps the high speed winding, and winding change-over is not done.

On the contrary, when the speed reference is changed over with the switch 14 closed from the state of $\omega_{REF} > \omega_{CHW}$ to that of $\omega_{REF} < \omega_{CHW}$, for example, when the speed reference is changed-over from the maximum speed of a high speed winding to 0 rpm, the speed comparators 37 and 38 are of "H" level and "L" level respectively while the inequality $\omega > \omega_{CHW}$ holds. The output of the AND circuits 41 and 42 are, therefore, both of "L" level and the output of the memory circuit 43 keeps "H" level. When the inequality $\omega < \omega_{CHW}$ occurs, the outputs of the speed comparators 37, the AND circuit 41, and the memory circuit 43 all come to the "L" level, and the output of the AND circuit 42 is of "H" level. Accordingly, the inverter 5 is provided with a control constants for a low speed winding, and the winding change-over device 33 is brought into a connection of a low speed winding. When the above description is summarized, the table 1 is obtained.

TABLE 1

| Speed command<br>Actual speed | $\omega_{REF} < \omega_{CHW}$ | $\omega_{REF} > \omega_{CHW}$ |
| --- | --- | --- |
| $\omega < \omega_{CHW}$ | Low speed winding | Preceding state is kept |
| $\omega < \omega_{CHW}$ | Preceding state is kept | High speed winding |

In the present embodiment, the motor speed reference value and the actual motor speed are alternately changed-over to compare either of them with the speed setting value. When the same winding is in the speed range used, the winding section command is generated, and when the same winding is not in the speed range used, the windings are not changed-over by holding the preceding winding selection command unless levels of the logical signals in the speed comparator agree with each other even if the speed reference $\omega_{REF}$ is larger than $\omega_{CHW}$, and operation of the motor is repeated by ON-OFF of the switch 14. Accordingly, since the life of the switches in the winding change-over device is prolonged, and at the same time, the motor speed is reduced by use of a high speed winding in the high speed area, the torque due to speed reduction is not lowered and the time required for speed reduction is not prolonged.

Change-over of windings sometimes is carried out during operation of a motor, that is, during supply of power. When the switches 6 and 7 are changed-over with each other in such a state of supply of power, the life of these switches is made shorter than that for change-over in the no current condition. Moreover, since currents are made unstable due to external disturbances of induced voltages from a rotor just after change-over of windings, overvoltages or overcurrents are liable to occur. This problem for the life of the switches can be solved by change-over of windings with motor currents cut-off during the no current condition. There is some time lag between the time point when a winding change-over signal is output and the time point when actual switches are changed-over. If currents are made to flow immediately after a winding change-over signal is output, change-over with current flowing may occur depending upon the timing. Accordingly, currents begin to flow after a winding change-over answer signal is received from switches in order to check secure the change over of switches.

Incidentally, for problem that overvoltages or overcurrents are liable to occur, the motor current is squeezed before it is changed-over and the induced voltage is made sufficiently small, eliminating influences of them, and then the windings are changed-over. The currents just after change-over of the windings are made small initially so as to prevent large currents from flowing just after the change-over of the winding owing to induced voltages and made gradually large. In this way, overcurrents or overvoltages in an unstable state after the change-over of the windings can be suppressed.

Figure 6A:
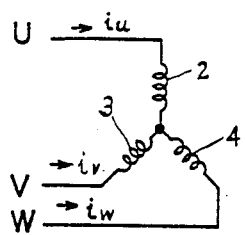
FIGS. 6A to 6D are explanatory diagrams showing the current in switching between a Y connection and a Δ-connection.
Figure 6B:
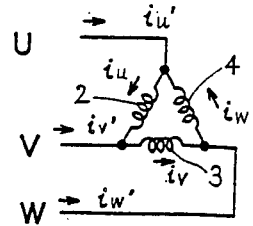
Figure 6C:
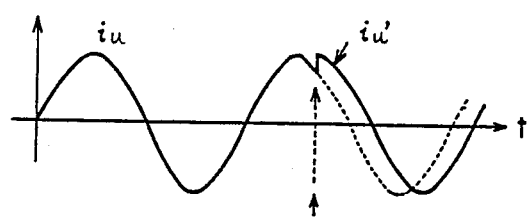
Figure 6D:
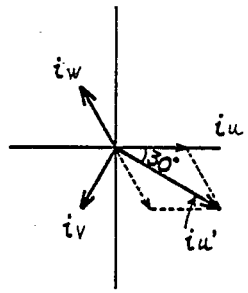

In the case where the windings are in a Y-Δ connection, the currents do not flow in the same phase for the windings if a phase of the current reference is not changed during change-over of the windings. This will be described, based on FIG. 6. FIG. 6A shows Y windings and FIG. 6B shows Δ windings. Here, let us consider change-over from the Y windings to Δ windings. At first, it is assumed that a current $i_u$ shown in FIG. 6C flows in the coil 2 in the Y connection. Considering the time point when the Y connection is changed-over to the Δ connection as to change-over of the windings, it is found from FIG. 6D that the current $i_u'$ flowing in the U phase lags in phase by 30° compared with the current $i_u$ flowing in the coil 2. Accordingly, in order not to vary the phase of the current made to flow in the coil 2 before and after the change-over of the winding, the phase may be made to lag by 30° before and after the change-over of the windings. Inversely, in the case where the Δ connection is changed-over to the Y connection, it is similarly understood that the phase needs to be advanced by 30° before and after the change-over of the windings.

Figure 4:
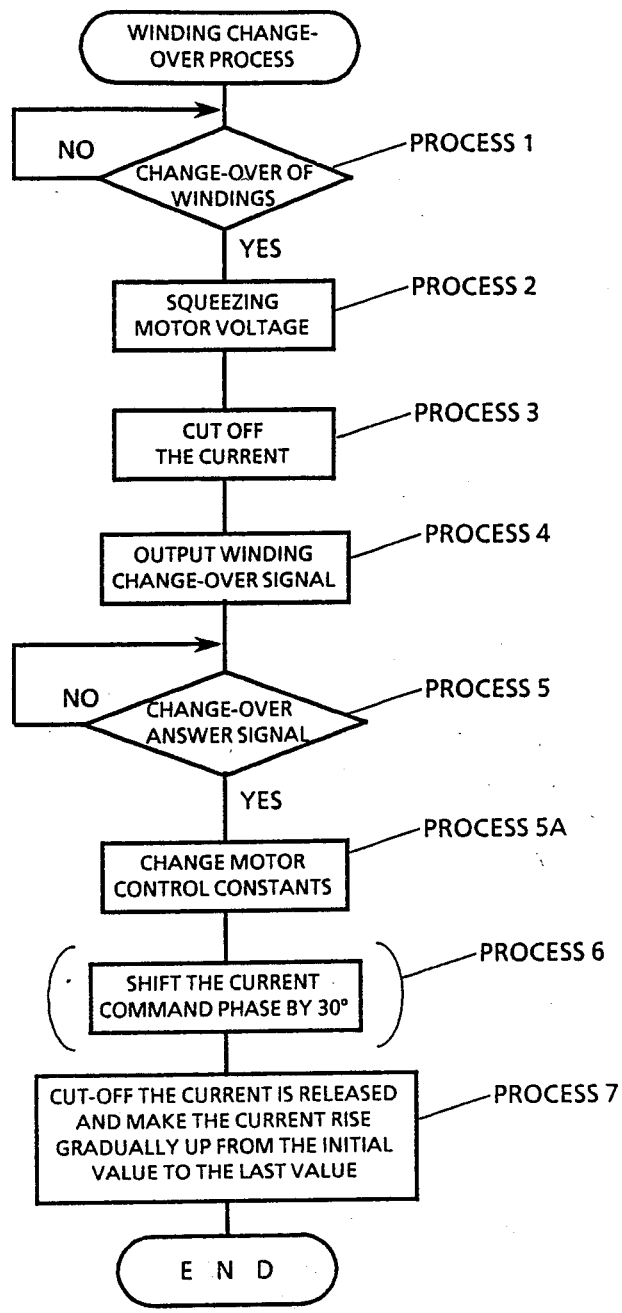
FIG. 4 is a flowchart showing an example of change-over processing for motor windings related to the present invention.
Figure 5:
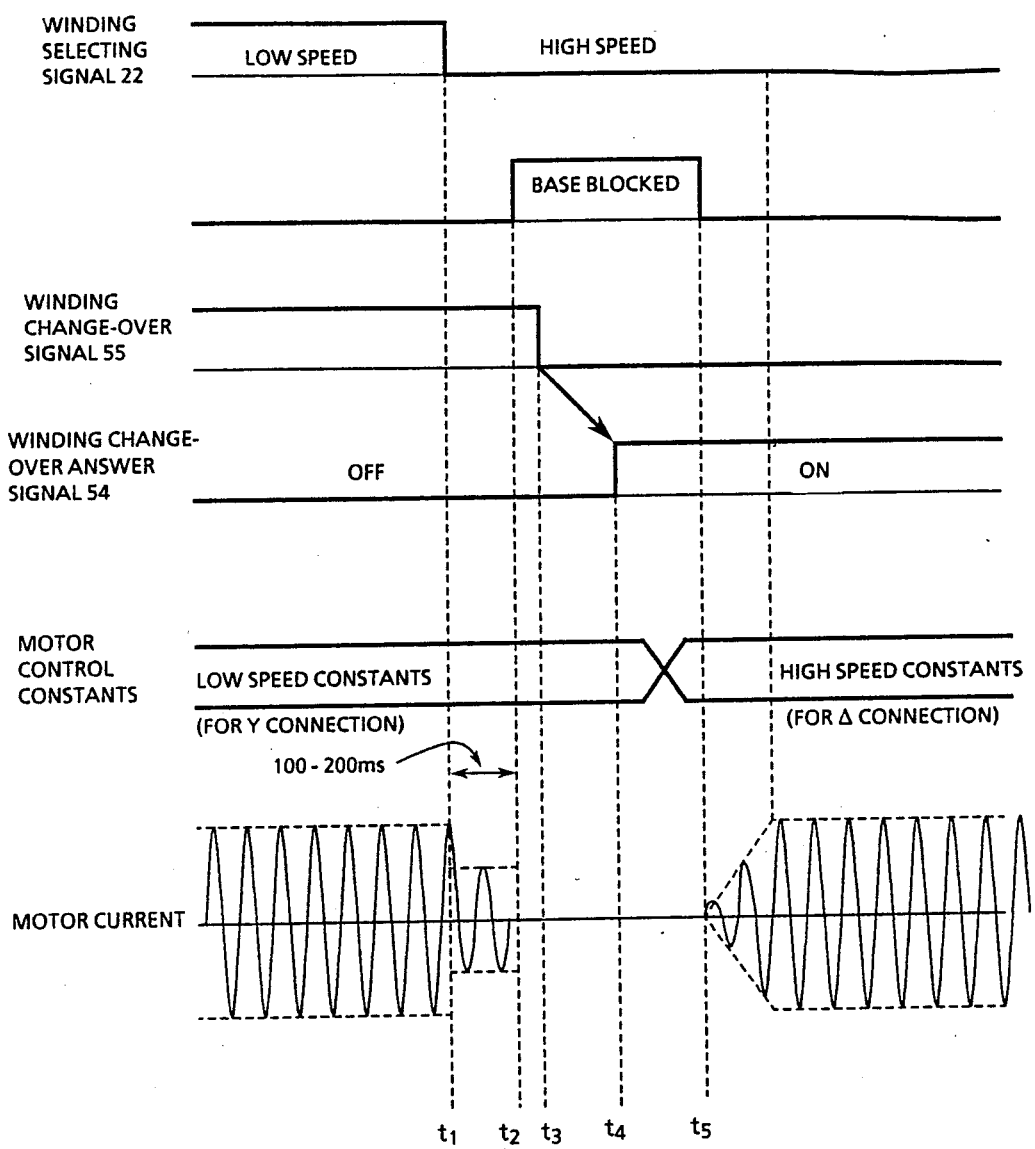
FIG. 5 is a time chart in the case where low speed windings are changed-over to high speed windings.

FIG. 4 is a flowchart showing an example of the change-over process of the above-mentioned windings, and FIG. 5 is a timing chart at the time when a low speed winding is changed-over to high speed winding. The winding change-over process will be described with reference to FIGS. 4 and 5. It is decided by Process 1 whether there is a change-over of windings or not. If a winding change-over signal operates at the time $t_1$ in FIG. 5, the motor voltage is squeezed in Process 2. In this case, it is realized by reducing the current to, for example, 100–200 ms or so ranging from $t_1$ to $t_2$. After completion of the squeezing, the current is cut off at the time $t_2$ to prepare for change-over in a state of no supply of power in Process 3. At the time $t_3$, the winding change-over signal 55 is output in Process 4. Thus, the switches 6 and 7 operate and the winding are changed-over. Next, the return of the winding change-over answer signal 54 is awaited in Process 5. If the answer signal 54 returns at the time $t_4$, the motor control constants 11 through 15 are changed in Process 5A. In case where windings are in Δ-Y connection, Process 6 is executed. In Process 6, when the change-over command commands Y→Δ, the phase of the current reference is made to lag by 30°. On the contrary, when the change-over command commands Δ→Y, the phase of the current is made to advance by 30°. Of course, in the case of the connection in which the phase of the current is not varied by change-over of windings, Process 6 is omitted.

After that, the cut-off the current is released at the time t5 in Process 7 to make the current rise gradually up to the current value required originally from its initial value. In this way, the sequence of change-over of the winding is completed.

In this embodiment, when the windings are changed-over the currents in the windings are cut off, and the change-over is carried out under no supply of power. After confirming that the windings have securely changed-over by the answer signal from the winding change-over switch, the current after the change-over of the windings begins to flow. In this manner, overvoltages or overcurrents due to induced voltage disturbances generated immediately after change-over of the windings can be suppressed, allowing the main circuit of the inverter to be protected. Moreover, the change-over of the switches under no supply of power permits the life of the switches to be prolonged.

What is claimed is:

1. An inverter driving method for the motor of a variable speed drive system comprising a polyphase induction motor capable of altering winding connections, means for altering a plurality of winding connections of said motor, storage means for a plurality of sets of motor control constants preset to enable optimal vector control with respective winding connections, means for providing a speed reference signal, means for providing a motor speed signal corresponding to the actual speed of the motor and means for providing an answer signal for confirming that the windings have been changed over, said inverter driving method comprising:

(a) setting predetermined speed ranges for the respective winding connections;
(b) when a speed reference signal and an actual motor speed signal are both within a speed range for a given winding connection:
   (b1) selecting the given winding connection by activating a winding selection function,
   (b2) blocking the currents for the windings to change over the windings during a state of no current flow in the windings,
   (b3) continuing calculation of phases of currents using vector control while blocking the currents so that said phases of currents are not changed before and after changing over of the windings,
   (b4) then after an answer signal is received from a switch for a winding change-over, reading out the set of motor control constants corresponding to the given windings connection from said storage means,
   (b5) controlling said motor by applying said read-out set of motor control constants to a vector controller of said motor, and
   (b6) shaping the currents after a winding change-over to rise in a ramp from a small value to a required current value with the following phase:
      (1) the same phase as calculated when the winding change-over is altered from Δ windings to 2Δ windings,
      (2) a phase leading the calculated phase by 30° when the winding change-over is altered from Δ windings to Y windings, and
      (3) a phase lagging the calculated phase by 30° when the winding change-over is altered from Y windings to Δ windings,
(c) when a speed reference signal and the actual speed signal of the motor are not within said speed range:
   (c1) controlling the motor without activating the winding selection function, and continuing to use the set of motor control constants for the winding connection currently in use.

* * * * *